United States Patent
Sangha et al.

(10) Patent No.: US 8,985,630 B2
(45) Date of Patent: Mar. 24, 2015

(54) CRADLE ASSEMBLY ATTACHABLE TO A VEHICLE

(71) Applicant: GM Global Technology Operations LLC, Detroit, MI (US)

(72) Inventors: Balbir S. Sangha, Ajax (CA); Joseph K. Moore, Whitby (CA); Zohir Molhem, Rochester Hills, MI (US); Dmitriy V. Mazur, West Bloomfield, MI (US); Michael A. Ray, Sterling Heights, MI (US); Qiang Xu, Mississauga (CA); Jintaek Kwon, Seoul (KR); Jongmin B. Park, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/946,071

(22) Filed: Jul. 19, 2013

(65) Prior Publication Data

US 2015/0021891 A1    Jan. 22, 2015

(51) Int. Cl.
    *B62D 21/00*  (2006.01)
    *B62D 21/09*  (2006.01)
    *B62D 21/12*  (2006.01)
    *B62D 21/15*  (2006.01)

(52) U.S. Cl.
    CPC .............. *B62D 21/155* (2013.01); *B62D 21/09* (2013.01); *B62D 21/12* (2013.01)
    USPC ................................... 280/784; 280/124.109

(58) Field of Classification Search
    CPC ........ B62D 21/00; B62D 21/11; B62D 21/15; B62D 25/20; B62D 21/152; B62D 21/155
    USPC ........... 280/784, 124.109; 180/232; 296/35.1, 296/35.2, 187.08, 187.09, 193.07, 203.2, 296/204
    See application file for complete search history.

(56) References Cited

U.S. PATENT DOCUMENTS

| | | | | |
|---|---|---|---|---|
| 5,605,353 | A  * | 2/1997 | Moss et al. ..................... | 280/784 |
| 6,367,869 | B1 * | 4/2002 | Baccouche et al. ...... | 296/187.09 |
| 7,066,047 | B2 * | 6/2006 | Amano et al. .................. | 74/512 |
| 7,992,926 | B2 * | 8/2011 | Tamakoshi ............... | 296/187.09 |
| 8,246,105 | B2 * | 8/2012 | Mildner ................... | 296/187.09 |
| 8,267,429 | B2 * | 9/2012 | Takeshita et al. ............. | 280/784 |
| 8,500,191 | B1 * | 8/2013 | Baccouche et al. ...... | 296/187.08 |
| 2014/0203543 | A1* | 7/2014 | Onishi et al. .................. | 280/784 |

FOREIGN PATENT DOCUMENTS

JP        2004130827 A * 4/2004 ............. B62D 21/15

* cited by examiner

*Primary Examiner* — Faye M. Fleming
(74) *Attorney, Agent, or Firm* — Quinn Law Group, PLLC

(57) ABSTRACT

A cradle assembly for a vehicle having an underbody is provided. The cradle assembly includes a cradle body attachable to the underbody of the vehicle by at least one fastener. The cradle body may define at least one pathway, which may have a first pathway portion and a second pathway portion between which the at least one fastener is movable. The at least one fastener may be positioned in the first pathway portion to enable the cradle body to be secured to the underbody, and in the second pathway portion to enable the cradle body to be separated from the underbody. The cradle body is configured to move with respect to the at least one fastener when an applied load on the vehicle is at or above a threshold magnitude.

19 Claims, 3 Drawing Sheets

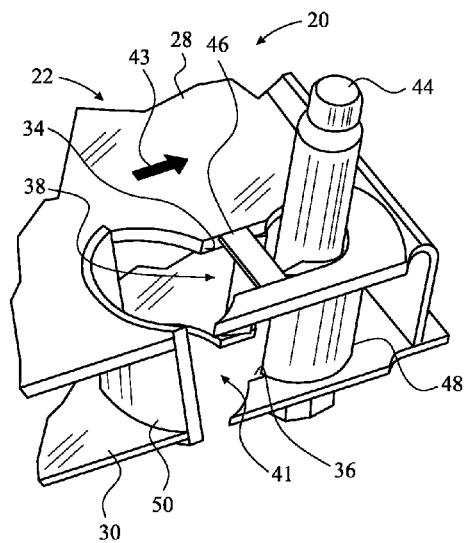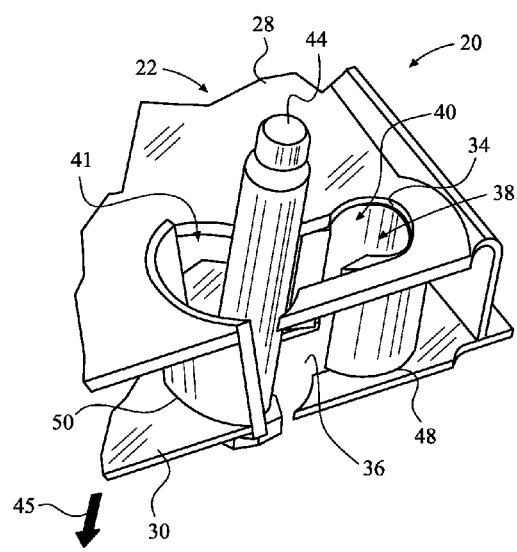
FIG. 3     FIG. 4
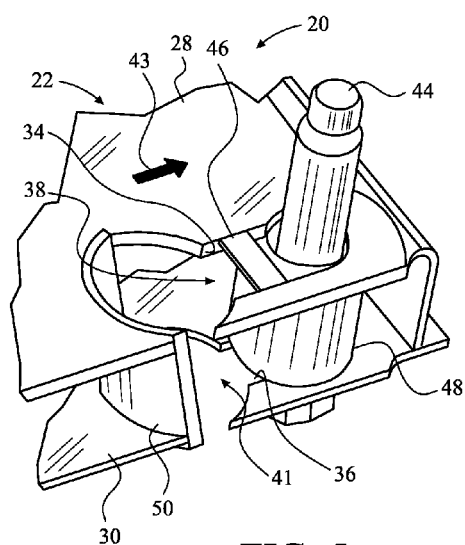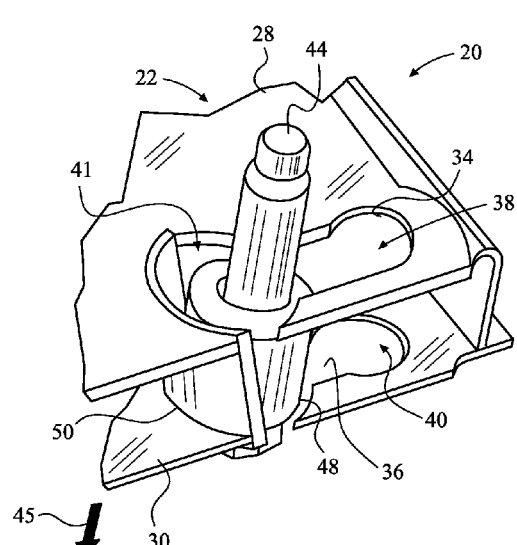
FIG. 5     FIG. 6

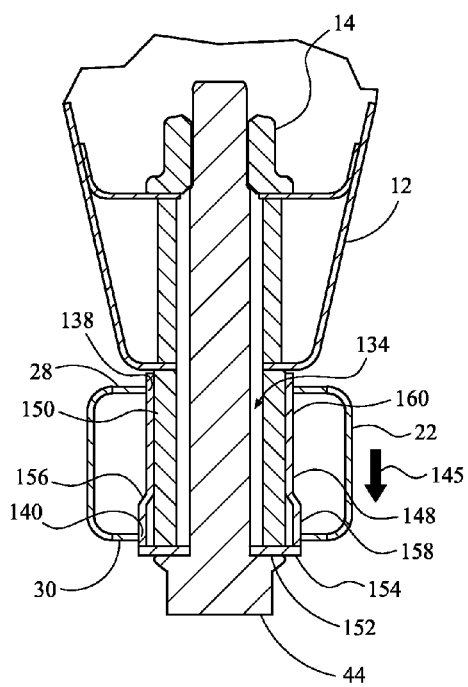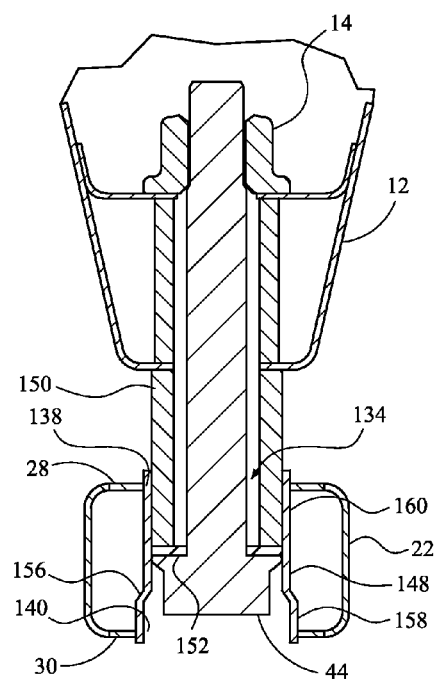
FIG. 7    FIG. 8
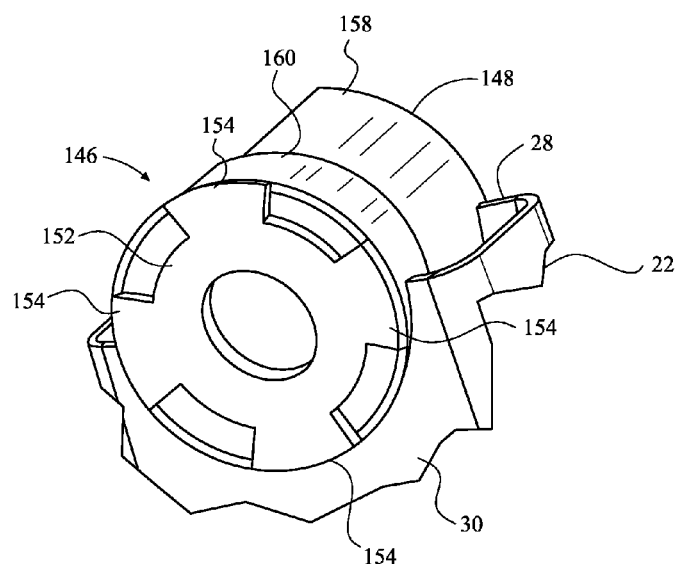
FIG. 9

CRADLE ASSEMBLY ATTACHABLE TO A VEHICLE

TECHNICAL FIELD

The present invention relates to a cradle assembly that is attachable to a vehicle.

BACKGROUND

Many vehicles include a cradle or sub-frame mounted to the underbody of the vehicle. The cradle is often located beneath the powertrain at the front end of the vehicle. The cradle serves to absorb energy, including vibrations and shocks, when a load is applied to the vehicle.

SUMMARY

A cradle assembly for a vehicle having an underbody is provided. The cradle assembly includes a cradle body that is attachable to the underbody of the vehicle by at least one fastener. The cradle body is configured to move with respect to the at least one fastener when an applied load on the vehicle is at or above a threshold magnitude. This enables the cradle body to be separated from the underbody of the vehicle.

In one embodiment, the cradle body may define at least one pathway that has a first pathway portion and a second pathway portion. The at least one fastener may be movable between the first pathway portion and the second pathway portion. The at least one fastener may be positioned within the first pathway portion to enable the cradle body to be secured to the underbody of the vehicle, and may be positioned within the second pathway portion to enable the cradle body to be separated from the underbody of the vehicle. The cradle body is configured to move to enable the at least one fastener to move from the first pathway portion to the second pathway portion with respect to the cradle body when the applied load is at or above the threshold magnitude.

In another embodiment, the cradle body may define at least one pathway in which the at least one fastener may be positioned to secure the cradle body to the underbody of the vehicle. The cradle body is configured to move along the at least one fastener when the applied load is at or above the threshold magnitude to enable the cradle body to be separated from the underbody of the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 3 and 4 are partial, perspective views at a joint location of the cradle assembly of FIG. 2 in a secured position and a released position, respectively, according to one embodiment of the present invention;

FIGS. 5 and 6 are partial, perspective views at a joint location of the cradle assembly of FIG. 2 in a secured position and a released position, respectively, according to another embodiment of the present invention;

FIGS. 7 and 8 are partial, cross-sectional views at a joint location of the cradle assembly in a secured position and a released position, respectively, according to another embodiment of the present invention, the cross-sectional views being taken generally at the lines labeled 7,8-7,8 of FIG. 2; and FIG. 9 is a partial, bottom perspective view of an attachment release assembly of the cradle assembly of FIGS. 7 and 8 with a fastener portion removed.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
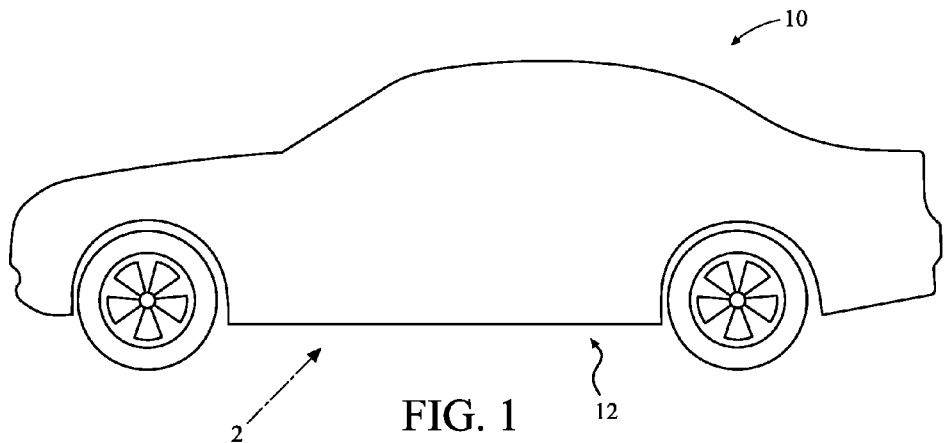
FIG. 1 is a side view of a vehicle having an underbody.
Figure 2:
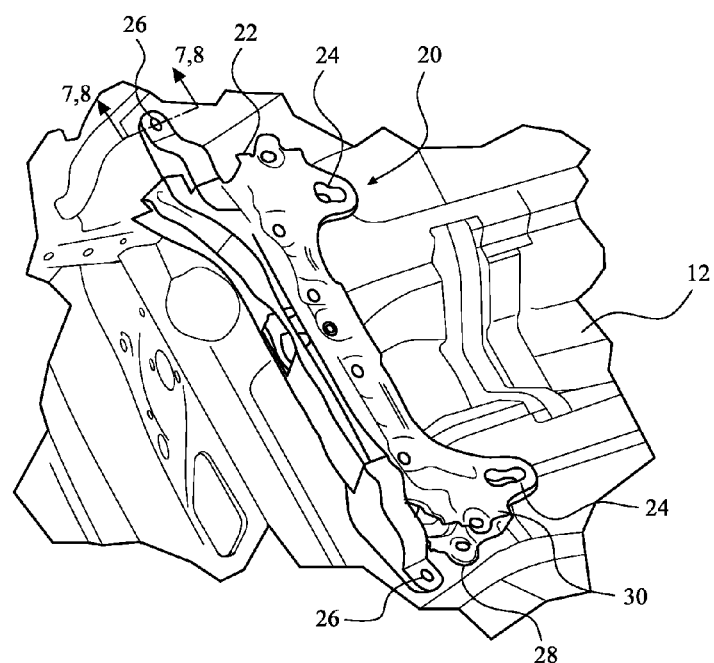
FIG. 2 is a partial, bottom perspective view of the vehicle with a cradle assembly oriented with respect to the vehicle and attachable to the underbody of the vehicle.

Referring to the drawings, wherein like reference numbers correspond to like or similar components wherever possible throughout the several figures, a vehicle 10 having an underbody 12 is shown in FIG. 1, and a cradle assembly 20 attachable and attached to the underbody 12 of the vehicle 10 is shown in FIG. 2. The cradle assembly 20 generally includes a cradle body 22 that is attached to the underbody 12 of the vehicle 10 by at least one fastener 44, as seen in FIGS. 3-8. The cradle body 22 may be attached to the underbody 12 at rear mount joint locations 24 and/or mid mount joint locations 26 on the cradle body 22, as seen in FIG. 2. While the cradle body 22 is shown at the front end of the underbody 12, it should be appreciated that it may be located at the rear of the underbody 12 as well. In one embodiment, the cradle body 22 may be formed from a top sheet or portion 28 and a bottom sheet or portion 30, as seen in FIGS. 3-8. In another embodiment not shown, the cradle body 22 may be formed from one solid piece of material.

The fastener 44 may be, but is not limited to, a bolt. The fastener 44 interacts with the underbody 12 of the vehicle 10 to generate a load on or tension in the fastener 44 to hold the cradle body 22 in a secured position, as seen in FIGS. 3, 5, and 7. The vehicle 10 may include a mating component 14, such as that seen in FIGS. 7 and 8, with which the fastener 44 is compatible. For example, in one embodiment, the fastener 44 may have threads (not shown) and the mating component 14 may be threaded such that the fastener 44 is screwed into the mating component 14 to generate the load to hold the cradle body 22 in the secured position. It should be appreciated that any other mechanism capable of holding the cradle body 22 in the secured position is also within the scope of the present invention.

When an applied load on the vehicle 10, a portion of which transfers to the cradle body 22, is at or above a threshold magnitude, the cradle body 22 is configured to move from the secured position to a released position such that the cradle body 22 may be separated from the vehicle 10, as described in more detail below.

Referring now to FIGS. 3 and 4, the cradle assembly 20, according to one embodiment of the present invention, is shown at one of the rear mount joint locations 24 shown in FIG. 2. At the rear mount joint location 24, the top sheet 28 may define a first opening 34 and the bottom sheet 30 may define a second opening 36 that are substantially aligned to form a pathway 38 in which the fastener 44 is movable with respect to the cradle body 22. The first opening 34 and the second opening 36 may be shaped like keyholes such that the pathway 38 has a first pathway portion 40 (as seen in FIG. 4) and a second pathway portion 41 (as seen in FIG. 3), where the second pathway portion 41 may have a greater cross-sectional area than the first pathway portion 40. The fastener 44 is positioned in the first pathway portion 40 to affix the cradle body 22 to the underbody 12 of the vehicle 10 in the secured position. The fastener 44 is positioned in the second pathway portion 41 to enable the cradle body 22 to slide off the fastener 44 in a vertical direction to allow the cradle body 22 to separate from the vehicle 10 at each rear mount joint location 24.

When the fastener 44 is positioned in the first pathway portion 40, the fastener 44 generally is in contact with the cradle body 22, for example, the underside of the head of the fastener 44 to the bottom sheet 30. The load on the fastener 44 creates a resistance between the fastener 44 and the cradle body 22 that holds the cradle body 22 in the secured position. The resistance may depend upon a coefficient of friction between the fastener 44 and the cradle body 22. When the applied load on the vehicle 10 is at or above the threshold magnitude, the resistance between the fastener 44 and the cradle body 22 may be overcome such that the cradle body 22 may be separated from the secured position. It may then move with respect to the fastener 44, as indicated by the arrow 43 in FIG. 3, such that the fastener 44 moves from being within the first pathway portion 40 to being within the second pathway portion 41 in the released position, as seen in FIG. 4. The cradle body 22 may then be moved vertically, as indicated by the arrow 45 in FIG. 4, sliding down the fastener 44 such that the cradle body 22 is separated from the vehicle 10.

The cradle assembly 20 also may include a release mechanism 46 configured to maintain the cradle body 22 in the secured position when the resistance between the fastener 44 and the cradle body 22 is overcome, but the applied load on the vehicle 12 is below the threshold magnitude. To accomplish this, the release mechanism 46 may provide a barrier between the first pathway portion 40 and the second pathway portion 41 such that the cradle body 22 is blocked from moving longitudinally (or laterally) with respect to the fastener 44, as seen in FIG. 3. As seen in FIGS. 3 and 5, the release mechanism 46 may be a separate tab, panel, or the like, attached to the cradle body 22. In embodiments in which the cradle body 22 is made of one solid piece of material, as described above, the release mechanism 46 may be integrated or incorporated in the cradle body 22. When the applied load is at or above the threshold magnitude, the release mechanism 46 may be configured to deform and/or detach from the cradle body 22, similar to a fuse, to separate the cradle body 22 from the secured position to the released position, as described above.

The threshold magnitude at which the cradle body 22 moves from the secured position to the released position may vary depending upon various factors. These factors may include, but are not limited to, the material of the cradle body 22, the material of the release mechanism 46, the size and shape of the cradle body 22, the size and type of the vehicle 10, the load securing the fastener 44 to the underbody 12 of the vehicle 10, the coefficient of friction between the fastener 44 and the cradle body 22, and the like.

The cradle assembly 20 further may include a first sleeve 48 around at least a portion of the first pathway portion 40, and a second sleeve 50 around at least a portion of the second pathway portion 41. The first sleeve 48 is initially attached to the cradle body 22 when in the secured position, and when the fastener 44 is within the first pathway portion 40. The first sleeve 48 may be attached to the cradle body 22 via a tack weld with, for example, the bottom sheet 30. When the fastener 44 is within the second pathway portion 41, the second sleeve 50 guides the cradle body 22 to slide vertically along the fastener 44, effectively extracting the fastener 44 from the cradle body 22 to separate the cradle body 22 from the vehicle 10, as explained above. The second sleeve 50 may be angled to further guide the cradle body along the fastener 44.

In one embodiment seen in FIGS. 3 and 4, the first sleeve 48 only partially encloses the fastener 44 within the first pathway portion 40. The first sleeve 48 remains intact with the cradle body 22 when the applied load is at or above the threshold magnitude, and thus does not move with the fastener 44 from the first pathway portion 40 to the second pathway portion 41, as depicted in FIG. 4. In such an embodiment, the first sleeve 48 and the second sleeve 50 may be connected, where the first sleeve 48 and the second sleeve 50 may be welded together, or alternatively, may be formed out of the same piece of material.

In another embodiment seen in FIGS. 5 and 6, the first sleeve 48 may be a bushing that encloses the fastener 44. In such an embodiment, the first sleeve 48 moves with the fastener 44 from the first pathway portion 40 to the second pathway portion 41, detaching from the cradle body 22. In embodiments in which the first sleeve 48 is attached to the cradle body 22 via at least one tack weld, the tack weld should be of sufficient strength to maintain attachment with the cradle body 22 when the applied load is below the threshold magnitude, as explained above, and to separate from the cradle body 22 when the applied load is at or above the threshold magnitude.

Referring now to FIGS. 7 and 8, the cradle assembly 20, according to another embodiment of the present invention, is shown at one of the mid mount joint locations 26 shown in FIG. 2. At the mid mount joint location 26, the cradle body 22 may define a pathway 134 in which the fastener 44 may be disposed. The pathway 134 may be defined by a first opening 138 and a second opening 140 in the top sheet or portion 28 and the bottom sheet or portion 30, respectively, of the cradle body 22. The fastener 44 is inserted through the pathway 134 to secure the cradle body 22 to the underbody 12 of the vehicle 10 in the secured position, as seen in FIG. 7.

The cradle assembly 20 may include a first sleeve 150 and a second sleeve 148. The first sleeve 150 encloses the fastener 44 within the pathway 134. The second sleeve 148 encloses the first sleeve 150 such that there is an interference fit between them. The second sleeve 148 also is attached to the cradle body 22, for example, via welding to the top sheet 28 and/or the bottom sheet 30.

As explained above, the fastener 44 interacts with the underbody 12 of the vehicle 10 such that a load on or tension in the fastener 44 is generated. The load is transferred to the first sleeve 150, which in turn exerts a force on the second sleeve 148 as a result of the interference fit between them, thereby holding the cradle body 22 in the secured position. When the applied load on the vehicle 10, a portion of which transfers to the cradle body 22, is at or above the threshold magnitude, the force exerted on the second sleeve 148 from the first sleeve 150 may be overcome such that the cradle body 22 may be separated from the secured position. This allows the cradle body 22 to then move vertically along the fastener 44, as indicated by the arrow 145 in FIG. 7, such that the cradle body 22 may be moved from the secured position into the released position, as seen in FIG. 8, and ultimately be separated from the vehicle 10.

The cradle assembly 20 also may include a washer 152 that has tabs 154, as seen in FIG. 9, and that is in contact with the fastener 44. The first sleeve 150 sits on the washer, and the second sleeve 148 sits on the tabs 154. The washer 152 is configured to maintain the cradle body 22 in the secured position when the force between the first sleeve 150 and the second sleeve 148 is overcome, but the applied load on the vehicle 12 is below the threshold magnitude. To achieve this, the first sleeve 150 sits on the washer 152, and the second sleeve 148 sits on the tabs 154. When the applied load is at or above the threshold magnitude, the portion of the applied load that is transferred to the cradle body 22 is transferred from the second sleeve 148 to both the first sleeve 150 and the tabs 154. The tabs 154 are configured to then deform and/or separate from the washer 152 such that the cradle body 22 may be separated from the secured position. While four tabs 154 are shown in FIG. 9, it should be appreciated that there may be any number of tabs 154.

The threshold magnitude at which the cradle body 22 separates from the secured position and/or the tabs 154 deform and/or separate may be set based on various factors. These may include, but are not limited to, the amount of surface contact area between the first sleeve 150 and the second sleeve 148, and the like. For example, the second sleeve 148 may include a step 156 that divides the second sleeve 148 into an upper portion 160 and a lower portion 158. The cross-sectional area of the upper portion 160 generally is smaller than the lower portion 158. The step 156 may be angled. The angle of the step 156 and/or the ratio of the height of the upper portion 160 to the lower portion 158 may be tuned to set the threshold magnitude at which the tabs 154 deform and/or separate from the washer 152.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A cradle assembly for a vehicle having an underbody, the cradle assembly comprising:
    a cradle body attachable to the underbody of the vehicle by at least one fastener, the cradle body defining at least one pathway in which the at least one fastener is movable with respect to the cradle body, the at least one pathway having a first pathway portion and a second pathway portion, the at least one fastener being positioned within the first pathway portion to enable the cradle body to be secured to the underbody of the vehicle, and being positioned within the second pathway portion to enable the cradle body to be separated from the underbody of the vehicle;
    wherein the cradle body is configured to move to enable the at least one fastener to move from the first pathway portion to the second pathway portion when an applied load on the vehicle is at or above a threshold magnitude.

2. The cradle assembly of claim 1 further comprising a release mechanism configured to separate from the cradle body or to deform when the applied load on the vehicle is at or above the threshold magnitude to enable the at least one fastener to move from the first pathway portion to the second pathway portion with respect to the cradle body.

3. The cradle assembly of claim 1 further comprising a first sleeve at least partially enclosing the first pathway portion, and a second sleeve at least partially enclosing the second pathway portion, the first sleeve being attached to the cradle body, and the second sleeve being configured to guide the cradle body to move vertically along the at least one fastener when it is within the second pathway portion.

4. The cradle assembly of claim 3 wherein the first sleeve is configured to remain attached to the cradle body when the applied load on the vehicle is at or above the threshold magnitude.

5. The cradle assembly of claim 3 wherein the first sleeve substantially encloses the at least one fastener, the first sleeve being configured to detach from the cradle body when the applied load on the vehicle is at or above the threshold magnitude.

6. A cradle assembly for a vehicle having an underbody, the cradle assembly comprising:
    a cradle body attachable to the underbody of the vehicle by at least one fastener, the cradle body defining at least one pathway in which the at least one fastener is positioned to secure the cradle body to the underbody of the vehicle;
    a washer including a washer body and at least one tab extending from the washer body, wherein the washer body is in contact with the least one fastener;
    wherein the cradle body is configured to move along the at least one fastener when an applied load on the vehicle is at or above a threshold magnitude to enable the cradle body to be separated from the underbody of the vehicle; and
    wherein the at least one tab is configured to separate from the washer body or to deform relative to the washer body when the applied load on the vehicle is at or above the threshold magnitude to enable the cradle body to be separated from the underbody of the vehicle.

7. The cradle assembly of claim 6 further comprising a first sleeve substantially enclosing the at least one fastener within the at least one pathway, and a second sleeve around the first sleeve, the second sleeve being attached to the cradle body.

8. The cradle assembly of claim 7 wherein the second sleeve sits on the at least one tab.

9. The cradle assembly of claim 8 wherein the second sleeve comprises an upper portion and a lower portion, the lower portion being in contact with the at least one tab of the washer, and having a cross-sectional area greater than that of the upper portion.

10. A cradle assembly for a vehicle having an underbody, the cradle assembly comprising:
    a cradle body attachable to the underbody of the vehicle by at least one fastener;
    a first sleeve encircling the at least one fastener;
    a second sleeve attached to the cradle body such that the second sleeve is configured to move along with the cradle body;
    wherein the cradle body is configured to move with respect to the at least one fastener when an applied load on the vehicle is at or above a threshold magnitude to enable the cradle body to be separated from the underbody of the vehicle;
    wherein the second sleeve is configured to move relative to the first sleeve and the at least one fastener when the applied load on the vehicle is at or above the threshold magnitude; and
    wherein the first sleeve encircles the at least one fastener while the cradle body moves relative to the at least one fastener when the applied load on the vehicle is at or above the threshold magnitude.

11. The cradle assembly of claim 10 wherein the cradle body defines at least one pathway having a first pathway portion and a second pathway portion, the at least one fastener being movable between the first pathway portion and the second pathway portion, the at least one fastener being positioned within the first pathway portion to enable the cradle body to be secured to the underbody of the vehicle, and being positioned within the second pathway portion to enable the cradle body to be separated from the underbody of the vehicle, and wherein the cradle body is configured to move to enable the at least one fastener to move from the first pathway portion to the second pathway portion with respect to the cradle body when the applied load is at or above the threshold magnitude.

12. The cradle assembly of claim 11 further comprising a release mechanism configured to separate from the cradle body or to deform when the applied load on the vehicle is at or above the threshold magnitude to enable the at least one fastener to move from the first pathway portion to the second pathway portion with respect to the cradle body.

13. The cradle assembly of claim 11 wherein the first sleeve at least partially encloses the first pathway portion, and the second sleeve at least partially encloses the second pathway portion, the first sleeve is attached to the cradle body, and the second sleeve is configured to guide the cradle body to move vertically along the at least one fastener when it is within the second pathway portion.

14. The cradle assembly of claim 13 wherein the first sleeve is configured to remain attached to the cradle body when the applied load on the vehicle is at or above the threshold magnitude.

15. The cradle assembly of claim 13 wherein the first sleeve substantially encloses the at least one fastener, the first sleeve being configured to detach from the cradle body when the applied load on the vehicle is at or above the threshold magnitude.

16. The cradle assembly of claim 10 wherein the cradle body defines at least one pathway in which the at least one fastener is positioned to secure the cradle body to the underbody of the vehicle, and wherein the cradle body is configured to move along the at least one fastener when the applied load is at or above the threshold magnitude to enable the cradle body to be separated from the underbody of the vehicle.

17. The cradle assembly of claim 16 wherein the first sleeve substantially encloses the at least one fastener within the at least one pathway, the second sleeve is around the first sleeve, and the second sleeve is attached to the cradle body.

18. The cradle assembly of claim 17 further comprising a washer having at least one tab on which the second sleeve sits, the at least one tab being configured to separate from the washer or to deform when the applied load on the vehicle is at or above the threshold magnitude to enable the cradle body to be separated from the underbody of the vehicle.

19. The cradle assembly of claim 18 wherein the second sleeve comprises an upper portion and a lower portion, the lower portion being in contact with the at least one tab of the washer, and having a cross-sectional area greater than that of the upper portion.

* * * * *